United States Patent
Lim et al.

(10) Patent No.: US 10,547,034 B2
(45) Date of Patent: Jan. 28, 2020

(54) SEALING APPARATUS OF POUCH-TYPE SECONDARY BATTERY

(71) Applicant: LG Chem, Ltd., Seoul (KR)

(72) Inventors: Seong-Yoon Lim, Daejeon (KR); Ji-Hyun Kim, Daejeon (KR)

(73) Assignee: LG Chem, Ltd. (KR)

(*) Notice: Subject to any disclaimer, the term of this patent is extended or adjusted under 35 U.S.C. 154(b) by 136 days.

(21) Appl. No.: 15/556,170

(22) PCT Filed: Mar. 28, 2016

(86) PCT No.: PCT/KR2016/003121
§ 371 (c)(1),
(2) Date: Sep. 6, 2017

(87) PCT Pub. No.: WO2016/159607
PCT Pub. Date: Oct. 6, 2016

(65) Prior Publication Data
US 2018/0047950 A1 Feb. 15, 2018

(30) Foreign Application Priority Data

Apr. 2, 2015 (KR) ............ 10-2015-0046932
Mar. 15, 2016 (KR) ............ 10-2016-0030974

(51) Int. Cl.
*H01M 2/08* (2006.01)
*H01M 10/04* (2006.01)

(52) U.S. Cl.
CPC ............ *H01M 2/08* (2013.01); *H01M 10/04* (2013.01)

(58) Field of Classification Search
CPC ............ H01M 10/04; H01M 10/0404; H01M 10/0587; H01M 2/021; H01M 2/0275; H01M 2/06; H01M 2/08
See application file for complete search history.

(56) References Cited

U.S. PATENT DOCUMENTS 6,632,538 B1* 10/2003 Yamazaki ............ H01M 2/021
428/213
8,739,400 B2 6/2014 Stancu et al.
(Continued)

FOREIGN PATENT DOCUMENTS

EP 0958631 B1 11/2001
JP 2000348695 A 12/2000
(Continued)

OTHER PUBLICATIONS

Extended European Search Report for Application No. EP16773388 dated Oct. 22, 2018.
(Continued)

*Primary Examiner* — Adam A Arciero
(74) *Attorney, Agent, or Firm* — Lerner, David, Littenberg, Krumholz & Mentlik, LLP

(57) ABSTRACT

Provided is a sealing apparatus of a pouch-type secondary battery, capable of preventing electrolyte leakage by constantly positioning a lead on a sealing groove so as to completely seal the secondary battery. A sealing apparatus according to the present disclosure is a sealing apparatus of a pouch-type secondary battery which seals a pouch case in which an electrode assembly is installed. The sealing apparatus includes upper and lower sealing blocks, wherein at least one sealing block of the upper and lower sealing blocks has a sealing groove having a slanted step portion which is formed at a position corresponding to the lead of the pouch-type secondary battery and a lead guide for seating the lead on the sealing groove is installed in front of the sealing block.

20 Claims, 8 Drawing Sheets

(56) References Cited

U.S. PATENT DOCUMENTS

| | | | |
|---|---|---|---|
| 2003/0182793 A1* | 10/2003 | Hald | H01M 2/021 29/730 |
| 2004/0126204 A1 | 7/2004 | Albrecht et al. | |
| 2006/0093905 A1* | 5/2006 | Kim | H01M 2/021 429/175 |
| 2006/0127760 A1 | 6/2006 | Hatta et al. | |
| 2012/0079711 A1* | 4/2012 | Stancu | B30B 1/18 29/623.1 |
| 2015/0000117 A1 | 1/2015 | Cho et al. | |

FOREIGN PATENT DOCUMENTS

| | | |
|---|---|---|
| JP | 2005216623 A | 8/2005 |
| KR | 100217393 B1 | 9/1999 |
| KR | 20140044444 A | 4/2014 |
| KR | 20140086907 A | 7/2014 |
| KR | 101452021 B1 | 10/2014 |
| WO | 2011024644 A1 | 3/2011 |
| WO | 2015065082 A1 | 5/2015 |

OTHER PUBLICATIONS

Search report from International Application No. PCT/KR2016/003121, dated Jul. 29, 2016.

* cited by examiner

SEALING APPARATUS OF POUCH-TYPE SECONDARY BATTERY

CROSS-REFERENCE TO RELATED APPLICATIONS

The present application is a national phase entry under 35 U.S.C. § of International Application No. PCT/KR2016/003121, filed Mar. 28,2016, which claims priority from Korean Patent Application No. 10-2015-0046932, filed Apr. 2, 2015 and Korean Patent Application No. 10-2016-0030974, filed Mar. 15, 2016, the disclosures of which are hereby incorporated herein by reference.

TECHNICAL FIELD

The present disclosure relates to a sealing apparatus for fabricating a pouch-type secondary battery, more particularly to a sealing apparatus for fabricating a pouch-type secondary battery having an improved sealing portion for sealing a pouch case and a lead.

BACKGROUND ART

Researches are actively carried out on the development of a rechargeable secondary battery in high-tech fields such as a digital camera, a cellular phone, a notebook computer, a hybrid vehicle, etc. The secondary battery includes a nickel-cadmium battery, a nickel-metal hydride battery, a nickel-hydrogen battery and a lithium secondary battery. Among them, the lithium secondary battery is used as a power source of portable electronic devices or used in high-power hybrid vehicles by being connected in series. The lithium secondary battery is widely used because its operation voltage is 3 times higher than the nickel-cadmium battery or the nickel-metal hydride battery and its energy density per unit weight is also superior.

The lithium secondary battery can be fabricated into various shapes, including cylindrical and prismatic shapes. Recently, the flexible pouch-type secondary battery is drawing a lot of attentions.

FIG. 1 shows a general pouch-type secondary battery 10 and a sealing apparatus 20 for sealing the pouch-type secondary battery 10.

Referring to FIG. 1, the pouch-type secondary battery 10 includes a pouch case consisting of an upper pouch 15a and a lower pouch 15b and a lead 17. The lead 17 extends from an electrode assembly (not shown) installed inside the pouch 15a, 15b so as to protrude outside the pouch 15a, 15b. And, a sealing portion 15 is formed along the edge of the pouch 15a, 15b so as to hermetically seal the pouch 15a, 15b.

The sealing apparatus 20 is installed to be ascendable and descendible by an ascending/descending means 30 provided above and below the pouch sealing portion 15. The sealing apparatus 20 compresses the sealing portion 15 as it ascends and descends. At this time, the sealing apparatus 20 heats the sealing portion 15 with heat generated by a heating means (not shown) equipped therein. That is to say, as the sealing apparatus 20 heats and compresses the sealing portion 15, the polymer of the pouch 15a, 15b is melted and sealing is achieved.

In order to prevent the leakage of an electrolyte inside the pouch 15a, 15b from leaking through the joint of the lead 17 and the pouch 15a, 15b, a film 18 of a thin resin layer is coated on the lead 17 as shown in FIG. 2. In FIG. 2, (a) is a view of the lead seen from above and (b) is a cross-sectional view along the line B-B' of (a). However, despite the coating of the film 18, the lead 17, which has a thickness of 50-1000 μm in general, is not completely sealed by the heat sealing, because the upper and lower pouches 15a, 15b are disposed as shown in FIG. 3, at the portion where the lead 17 corresponds to the upper and lower pouches 15a, 15b and the electrolyte may leak. That is to say, because the lead 17 has a predetermined thickness as descried above, the joined portion gets loose due to the thickness of the lead 17 after the joining of the pouch 15a, 15b. If the upper and lower cases around the lead 17 are joined incompletely as described above, the electrolyte may leak around the lead, thereby degrading electrical properties of the secondary battery after repeated charging and discharging. In order to solve this problem, an improved sealing apparatus which seals the lead 17 after disposing it between upper and lower heating blocks is disclosed, as shown in FIG. 4.

Referring to FIG. 4, the sealing apparatus 40 is equipped with upper and lower heating blocks 41, 42 equipped with a heating means (not shown) and sealing grooves 41a, 42a on which a lead 17 is seated during sealing are formed on the portions of the heating blocks 41, 42 corresponding to the lead 17 disposed between upper and lower cases 15a, 15b. The sealing grooves 41a, 42a are configured such that the lead 17 is seated thereon and the portions other than the lead 17 are sufficiently compressed to ensure sealing. The lead 17 is sealed with its thickness compensated by the sealing grooves 41a, 42a.

However, because the lead 17 is not constantly positioned on the sealing grooves 41a, 42a in the actual sealing process, the sealing grooves 41a, 42a usually have a margin d considering the tolerance of the lead 17, as shown in FIG. 5. In general, the sealing grooves 41a, 42a are formed to have a width about 10% wider than the width of the lead 17.

As indicated by the dashed arrows in FIG. 6, the sealing process can be performed even when the position on which the lead 17 is seated is not constant. However, due to the margin, an unsealed portion not compressed by the sealing apparatus 40 is formed by the difference in the widths of the sealing grooves 41a, 42a and the lead 17, i.e., the margin. As the thickness of the lead 17 is larger and as the depth and width of the sealing grooves 41a, 42a increase, the unsealed portion becomes larger too. In addition, if the sealing condition or the lead condition changes, the void space, or gap, between the sealing groove 42a and a film 18 may not be filled as shown in FIG. 6. In this case, the sealing is not achieved completely and electrolyte leakage may occur.

DISCLOSURE

Technical Problem

The present disclosure is directed to providing a sealing apparatus of a pouch-type secondary battery, capable of preventing electrolyte leakage by constantly positioning a lead on a sealing groove so as to completely seal the secondary battery.

Technical Solution

In an aspect, the present disclosure provides a sealing apparatus of a pouch-type secondary battery which seals a pouch case in which an electrode assembly is installed, wherein the sealing apparatus includes upper and lower sealing blocks and at least one sealing block of the upper and lower sealing blocks has a sealing groove having a slanted step portion which is formed at a position corresponding to a lead of the pouch-type secondary battery, and a lead guide for seating the lead on the sealing groove is installed in front of the sealing block.

Specifically, the lead guide may be a pair of blocks which form a gap space in which the lead can be accommodated. The edge portion of the block facing the lead may be chamfered to a tapered shape. The gap space may be designed to be 0.1-2.0 mm apart from the width of the lead.

When conducting a sealing process, the lead guide may determine the position of the lead earlier than the sealing blocks. Alternatively, the lead guide may determine the position of the lead as being applied simultaneously with the sealing blocks.

The block may have a roughly hexahedral shape and the tapered surface may be flat, convex upwardly or concave downwardly.

The lead guide may be operated vertically with the gap space maintained in order to determine the position of the lead.

The lead guide may be operated sideways to adjust the gap space in order to determine the position of the lead.

The lead guide may also be operated in a pivot manner to adjust the gap space in order to determine the position of the lead.

Advantageous Effects

If a lead guide is installed according to the present disclosure, the precision of positioning of a lead on a sealing groove during a sealing process is increased remarkably. Through this, the gap between the sealing groove and the lead can be minimized and a pouch sealing portion can be formed uniformly and sealed completely. Accordingly, the leakage of an electrolyte inside a pouch to outside may be prevented and the sealability and reliability of a pouch-type secondary battery may be improved.

DESCRIPTION OF DRAWINGS

The accompanying drawings illustrate specific embodiments of the present disclosure and, together with the foregoing disclosure, serve to provide further understanding of the technical features of the present disclosure, and thus, the present disclosure is not construed as being limited to the drawings.

BEST MODE

Figure 1:
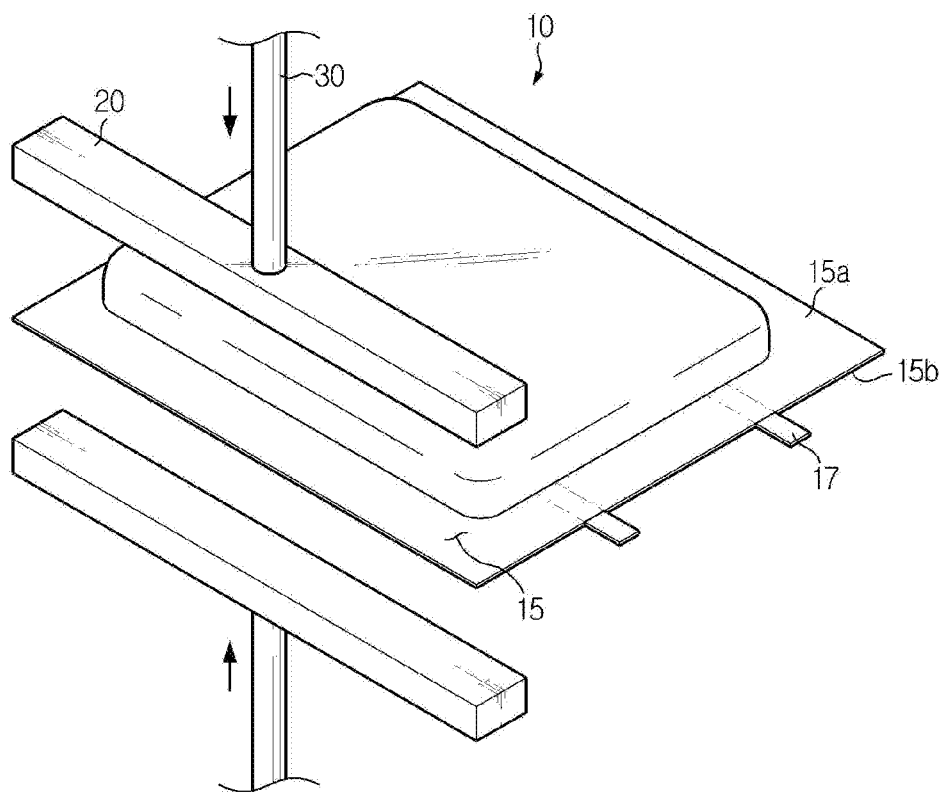
FIG. 1 shows a general pouch-type secondary battery and a general sealing apparatus.
Figure 2:
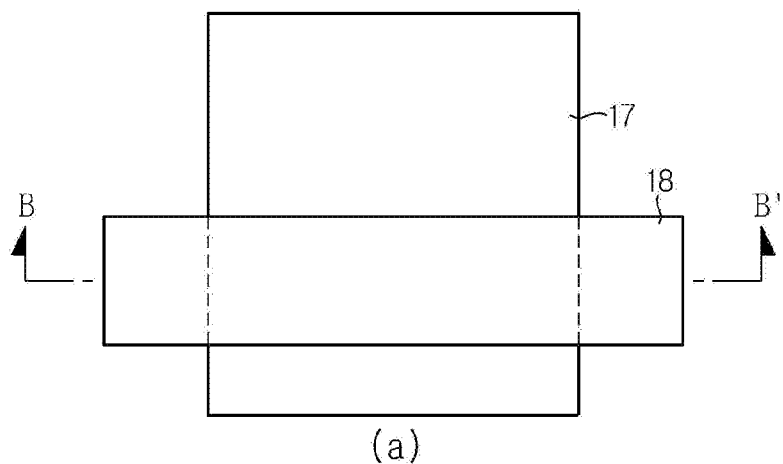
FIG. 2 shows a film of a thin resin layer coated on a lead.
Figure 3:
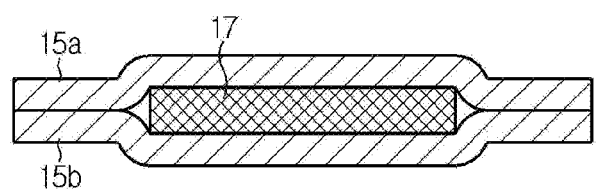
FIG. 3 is a cross-sectional view showing a lead sealed with an existing sealing apparatus.
Figure 4:
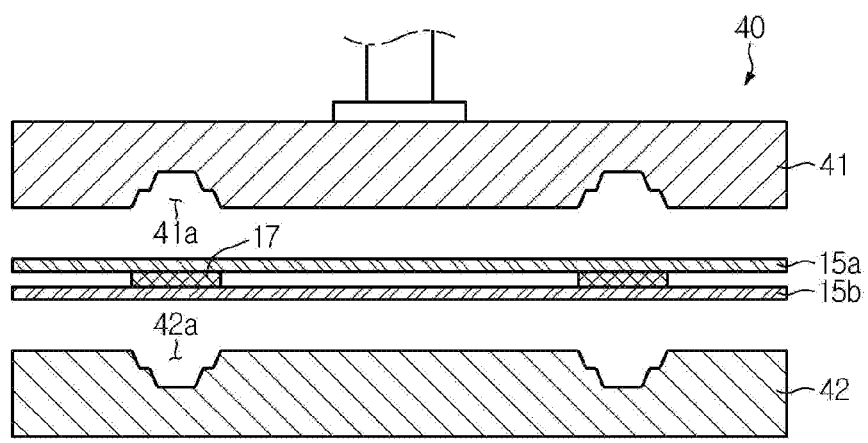
FIG. 4 shows another existing sealing apparatus equipped with a sealing groove.
Figure 5:
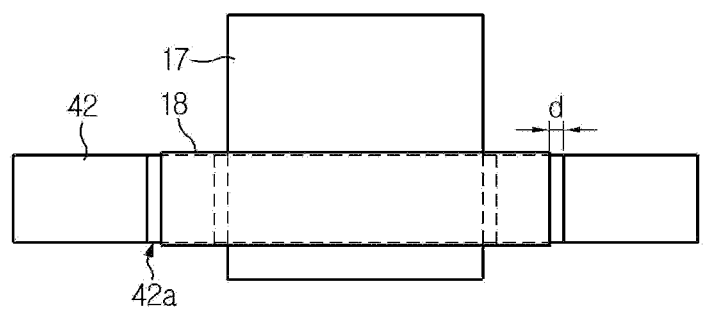
FIG. 5 and FIG. 6 show the generation of a gap between a sealing groove and a lead film in an existing sealing apparatus.
Figure 6:
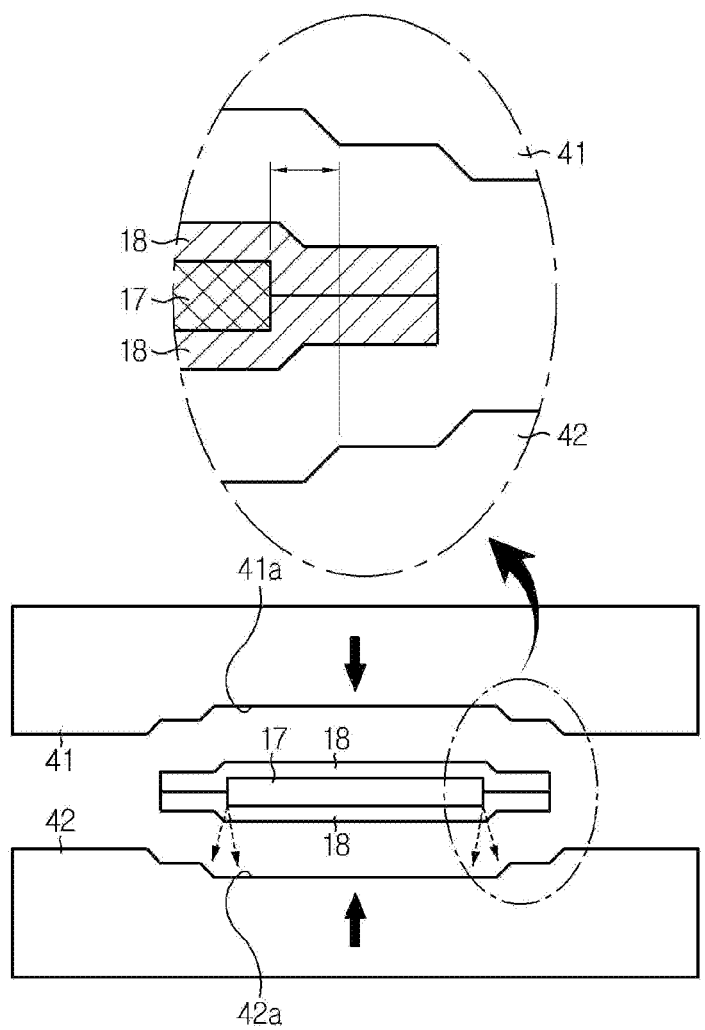

Hereinafter, specific exemplary embodiments of the present disclosure are described in detail referring to the accompanying drawings. However, the present disclosure is not limited to the exemplary embodiments described below but may be embodied in various different forms. The exemplary embodiments are provided so that the present disclosure is complete and the scope of the present disclosure is completely understood by those of ordinary skill. In the drawings, the shapes, etc. of elements may be exaggerated for clarity and like numerals represent like elements.

Figure 7:
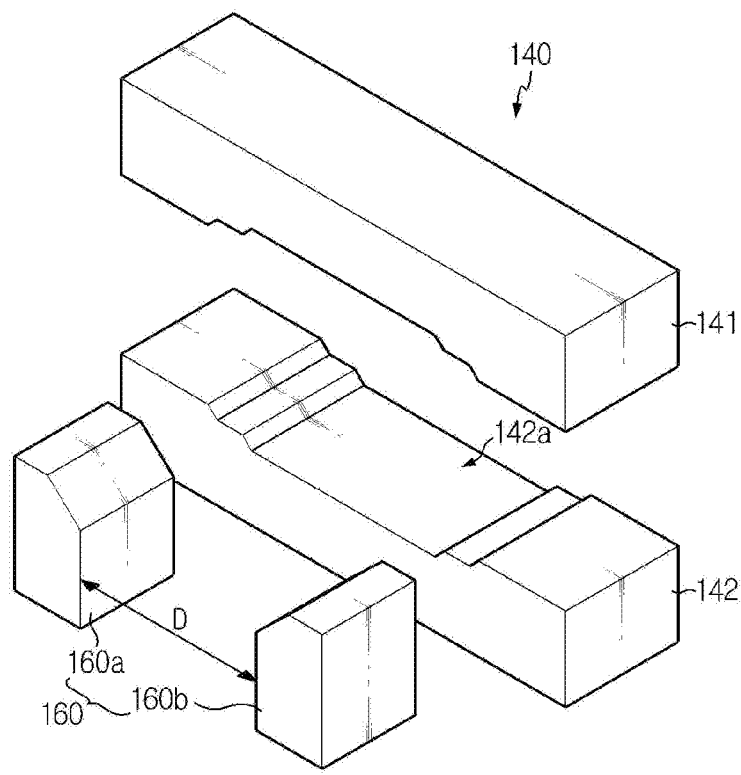
FIG. 7 is a schematic perspective view of a sealing apparatus according to the present disclosure.
Figure 8:
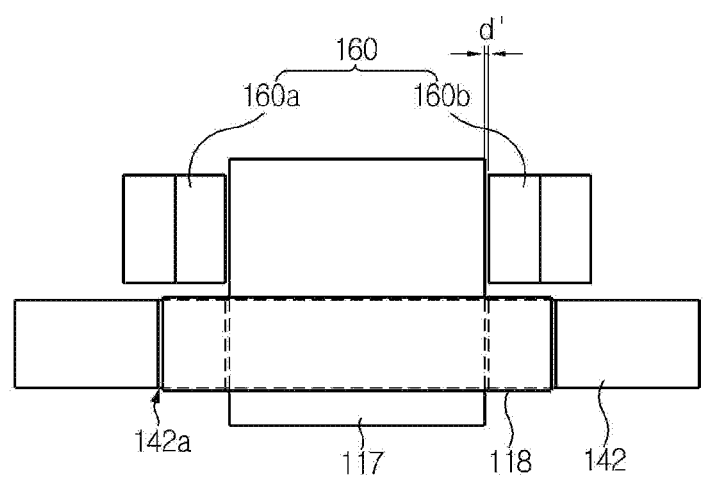
FIG. 8 is a front view of FIG. 7 in the state where a lead is seated on a sealing apparatus and FIG. 9 is a cross-sectional view.
Figure 9:
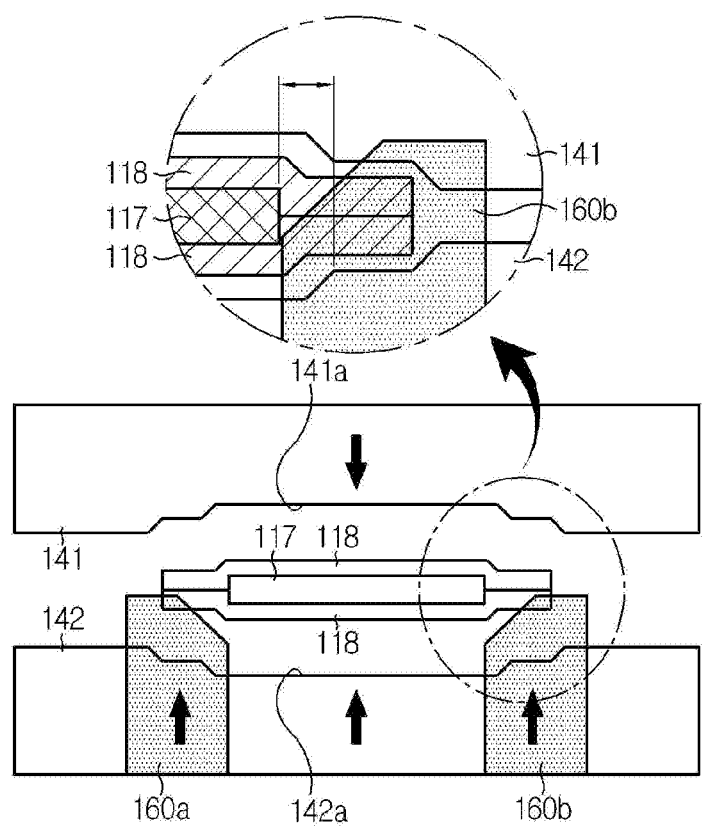

FIG. 7 is a schematic perspective view of a sealing apparatus according to the present disclosure. FIG. 8 is a front view of FIG. 7 in the state where a lead is seated on the sealing apparatus and FIG. 9 is a cross-sectional view.

First, as shown in FIG. 7, the sealing apparatus 140 according to the present disclosure includes upper and lower sealing blocks 141, 142 in the form of two bar-type rods so as to hot-press a sealing portion of a pouch from upward and downward. In the upper and lower sealing blocks 141, 142, sealing grooves 141a, 142a including slanted step portions are formed at a position corresponding to a lead 117 of a pouch-type secondary battery. A lead guide 160 is installed in front of the sealing blocks 141, 142 so that the lead 117 can be seated on the sealing grooves 141a, 142a.

The sealing blocks 141, 142 are installed to be ascendable and descendible. As a means for the ascending and descending, a widely used cylinder, etc. may be used. However, any means which allows the ascending and descending of the sealing blocks 141, 142 may be used without being limited thereto.

The sealing apparatus 140 may have the sealing grooves 141a, 142a formed on the position corresponding to the leads of a one-way lithium secondary battery whose leads protrude in the same direction. Alternatively, the sealing apparatus 140 may have the sealing grooves 141a, 142a formed on the position corresponding to the leads of a two-way lithium secondary battery whose leads protrude in opposite directions.

The sealing grooves 141a, 142a may be formed on one side of the sealing blocks 141, 142 only. The depth of the sealing grooves 141a, 142a may range from ½ of the thickness of the lead to the thickness of the lead. When the sealing grooves 141a, 142a are formed on both sides of the sealing blocks 141, 142, the depth of each of the sealing grooves 141a, 142a may be ½ of the thickness of the lead.

The sealing grooves 141a, 142a have slanted step portions as shown in the figure. The slanted step portions may be formed to have two or more steps.

The sealing apparatus 140 performs sealing in the state where the lead protruding from an electrode assembly accommodated in a pouch case is seated on the sealing grooves 141a, 142a.

The electrode assembly may be one of a jelly roll-type electrode assembly which is prepared by sequentially stacking one or more anode, separator and cathode and winding the same; a stack-folding type electrode assembly which is prepared by arranging a unit cell wherein an anode, a separator and a cathode are sequentially stacked on a separator in the form of a long film and winding the same in one direction; and a stack-folding type electrode assembly which is prepared by arranging a unit cell wherein an anode, a separator and a cathode are sequentially stacked on a separator in the form of a long film and winding the same in a zigzag manner.

Referring to FIG. 7 and FIG. 8 together, the lead guide 160 according to the present disclosure is a pair of blocks 160a, 160b which form a gap space D in which the lead 117 can be accommodated.

The blocks 160a, 160b may have a roughly hexahedral shape and the edge portion of the blocks 160a, 160b facing the lead 117 may be chamfered to a tapered shape. Because the gap between the chamfered portions is increased as compared to the lower portions, process flexibility may be improved during the positioning of the lead 117.

Referring to the enlarged cross-sectional view FIG. 9, the height of the lead guide 160 may be set higher than the lead 117 when positioning the lead. In general, the width between the ends of the blocks 160a, 160b is set larger than the width of the sealing grooves 141a, 142a to ensure stability. The lead guide 160 may be moved vertically and sideways by a driving means. The blocks 160a, 160b may be moved sideways with respect to each other so as to adjust the gap space D between the blocks 160a, 160b corresponding to the size of the lead. Once the gap space D is determined according to the lead condition, the gap space D is not changed throughout the process. Then, if a lead of another condition is input, the gap space D is reset for the corresponding process.

Specifically, the blocks 160a, 160b may be made of an elastic material such that an impact is not applied to the lead 117 during the positioning of the lead 117 even when they are in contact with the lead 117. Also, specifically, the blocks 160a, 160b may be made of an insulating material in order to avoid electrical problems. The gap space D may be designed to be 0.1-2.0 mm apart from the width of the lead. That is to say, the distance between the distance d' between the blocks 160a, 160b and the edges of the lead 117 may be 0.1-2.0 mm.

Upper and lower pouches constituting the pouch case are made of an inner resin layer and an outer metal foil (mostly an aluminum foil) (an additional resin layer covering the metal foil layer may be formed as the outermost layer) and the sealing is performed by hot-pressing the inner resin layer formed of a thermoplastic resin (e.g., polypropylene). For this, the sealing portion of the pouch is heated and compressed at constant temperature and pressure.

The lead 117 is prepared with a polymer film 118 as a sealant positioned above and below. The sealing is performed by forming the sealing grooves 141a, 142a up and down along the pouch edge and compressing the sealing portion from up and down at constant pressure and temperature. Specifically, the pressure applied to the sealing portion may be 0.1-5 MPa. During the sealing, the pressure applied to the sealing portion may be maintained constant by equipping a pressure gauge at the sealing blocks 141, 142. Specifically, the heat applied to the sealing portion may be maintained at 25-500° C. When the temperature is below 25° C., the sealing may not be achieved sufficiently and enough energy to evaporate the electrolyte may not be delivered. And, when the temperature is above 500° C., the pouch itself may be damaged by the heat.

Because the lead guide 160 improves the precision of the positioning of the lead 117, the position of the lead 117 is maintained constant during a sealing process as shown in FIG. 9. From the enlarged cross-sectional view FIG. 9, it can be seen that the gap between the sealing grooves 141a, 142a and film 118 almost disappears because the positioning error during the sealing can be reduced due to the lead guide 160.

When conducting the sealing process, the lead guide 160 may determine the position of the lead 117 earlier than the sealing blocks 141, 142. Alternatively, the lead guide 160 may determine the position of the lead 117 as being applied simultaneously with the sealing blocks 141, 142.

In the sealing apparatus 140 described referring to FIGS. 7-9, the lead guide 160 consists of a pair of the blocks 160a, 160b and the edge portion of the blocks 160a, 160b is chamfered to a tapered shape.

Figure 10:
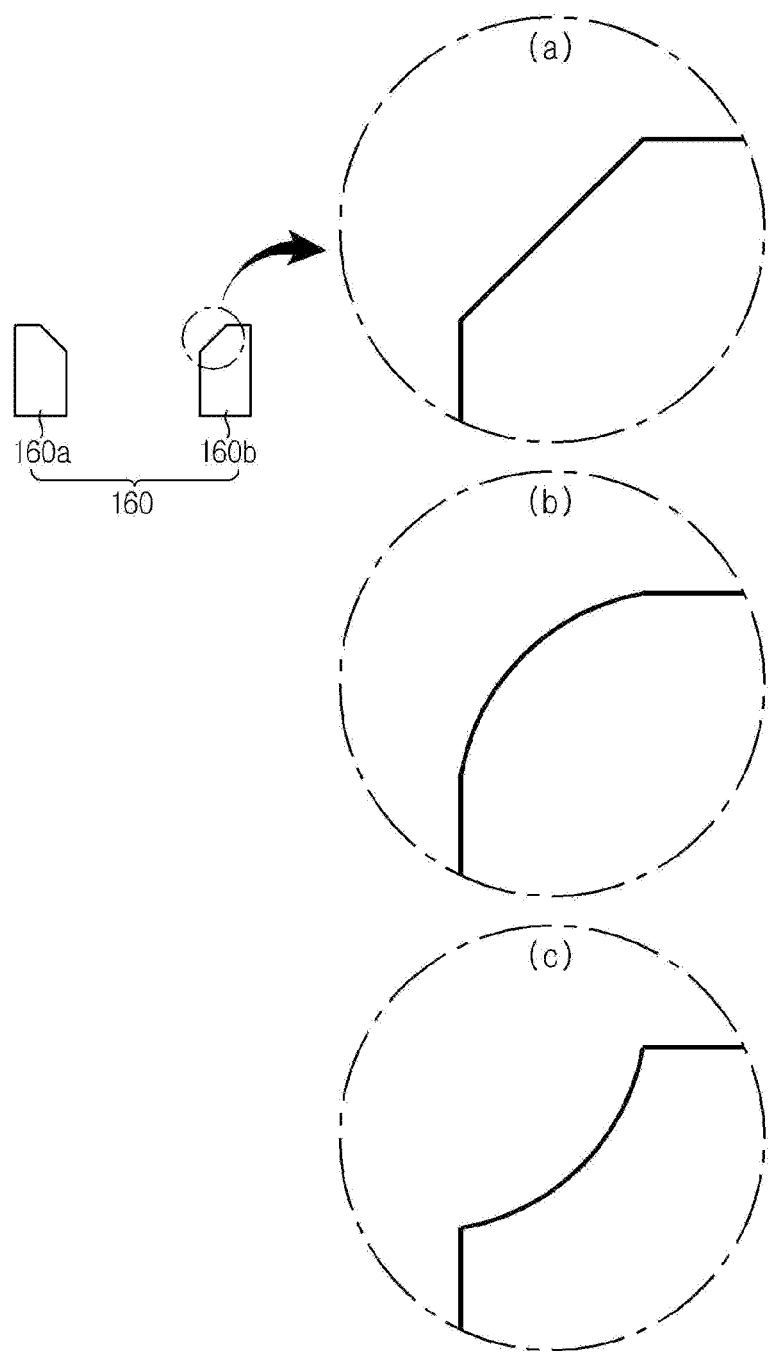
FIG. 10 shows cross-sectional views showing various configurations of a lead guide that can be included in the sealing apparatus according to the present disclosure.

FIG. 10 shows cross-sectional views showing various configurations of the lead guide that can be included in the sealing apparatus according to the present disclosure.

Referring to FIG. 10, the tapered surface of the blocks 160a, 160b may be flat as shown in (a), convex upwardly as shown in (b) or concave downwardly as shown in (c). (a) is advantageous in that processing is easy. (b) is advantageous in that physical impact to the lead can be reduced during positioning of the lead. (c) is advantageous in that process flexibility is improved during positioning of the lead.

Figure 11:
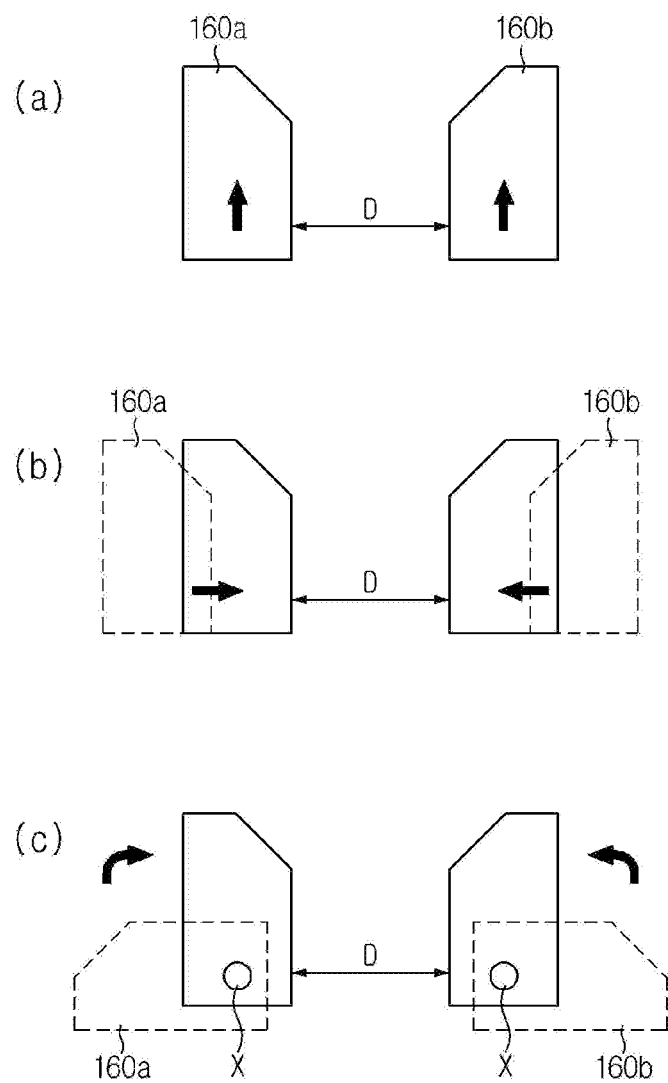
FIG. 11 shows various operations of a lead guide that can be included in the sealing apparatus according to the present disclosure.

It was described above that the blocks 160a, 160b of the lead guide 160 can move vertically and sideways and that the blocks 160a, 160b can move sideways with respect to each other. FIG. 11 shows various operations of the lead guide that can be included in the sealing apparatus according to the present disclosure.

In FIG. 11, (a) shows operation of the blocks 160a, 160b of the lead guide 160 upward and downward and (b) shows operation of the blocks 160a, 160b of the lead guide 160 sideways. An operation of the combination of (a) and (b) is also possible.

In case the process is performed after the gap space D is set according to the lead condition, the blocks 160a, 160b may be installed with the gap space D and then the blocks 160a, 160b may be moved upwardly from the bottom of the sealing apparatus to the lead position while maintaining the gap space D, as shown in (a).

Alternatively, as shown in (b), the blocks 160a, 160b may be arranged farther than the gap space D with respect to each other before the positioning of the lead and then the blocks 160a, 160b may be operated sideways to match the gap space D during the positioning of the lead.

FIG. 11 (c) shows an operation in a pivot manner unlike the vertical or sideways operation. As shown in (c), the blocks 160a, 160b may be arranged horizontally in advance and then may be rotated about the axes of the blocks 160a, 160b when positioning of the lead is necessary, so that the spacing between the blocks 160a, 160b becomes the gap space D.

As described above, the present disclosure can greatly improve the sealability of the pouch case around the lead for secondary batteries having leads with various thicknesses by equipping the lead guide 160. The sealability of the battery can be improved by ensuring tight joining of the lead with the pouch case and, thereby, the unsealed portion can be decreased significantly.

In addition, because the lead can be constantly positioned on the sealing grooves, there is no need of considering tolerance in the cross section of the lead when designing the sealing grooves. That is to say, it is possible to make the sealing grooves have almost the same width as the lead with no margin and it is easy to accurately seat the lead on the sealing grooves. Because the lead is sealed as being stably seated on the sealing grooves, the sealing can be performed accurately and uniformly and there is no risk of leakage of the electrolyte.

For the high-capacity, high-output mid- to large-sized secondary batteries, the demand of which is increasing rapidly recently, the thickness of the lead is increasing with the capacity of unit cells used therein. As the size of the lead increases, the unsealed portion not compressed by the existing sealing apparatus is enlarged and the sealing is not achieved as desired, thereby lowering the reliability of sealing. However, according to the present disclosure, the reliability of sealing is ensured because accurate positioning is possible regardless of the thickness of the lead.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A sealing apparatus of a secondary battery which seals a pouch case in which an electrode assembly is installed, comprising:
    an upper sealing block and a lower sealing block, at least one sealing block of the upper and lower sealing blocks including a sealing groove having a slanted step portion which is formed at a position corresponding to a lead of the secondary battery, and
    a lead guide adapted to position the lead on the sealing groove, the lead guide being installed adjacent to the at least one sealing block and aligned with the sealing groove.

2. The sealing apparatus according to claim 1, wherein the lead guide includes a pair of blocks which form a gap space between them in which the lead can be accommodated.

3. The sealing apparatus according to claim 2, wherein an edge portion of each block facing the lead and positioned along the gap space is chamfered to define a tapered opening leading to the gap space.

4. The sealing apparatus according to claim 2, wherein the gap space is 0.1-2.0 mm apart from the width of the lead.

5. The sealing apparatus according to claim 2, wherein the lead guide can move vertically and sideways.

6. The sealing apparatus according to claim 2, wherein the width between the ends of the blocks is larger than the width of the sealing groove.

7. The sealing apparatus according to claim 2, wherein the blocks can move sideways with respect to each other.

8. The sealing apparatus according to claim 1, wherein the lead guide is made of an elastic material.

9. The sealing apparatus according to claim 1, wherein the lead guide is made of an insulating material.

10. The sealing apparatus according to claim 1, wherein the lead guide determines the position of the lead earlier than the sealing blocks.

11. The sealing apparatus according to claim 1, wherein the lead guide determines the position of the lead as being applied simultaneously with the sealing blocks.

12. The sealing apparatus according to claim 1, wherein the height of the lead guide is set higher than the lead when determining the position of the lead.

13. The sealing apparatus according to claim 3, wherein the chamfered edge portions of each block are flat.

14. The sealing apparatus according to claim 3, wherein the chamfered edge portions of each block are convex upwardly.

15. The sealing apparatus according to claim 3, wherein the chamfered edge portions of each block are concave downwardly.

16. The sealing apparatus according to claim 2, wherein the lead guide is operated vertically with the gap space maintained in order to determine the position of the lead.

17. The sealing apparatus according to claim 2, wherein the lead guide is operated sideways to adjust the gap space in order to determine the position of the lead.

18. The sealing apparatus according to claim 2, wherein the lead guide is operated in a pivot manner to adjust the gap space in order to determine the position of the lead.

19. A sealing apparatus of a secondary battery which seals a pouch case in which an electrode assembly is installed, wherein
    the sealing apparatus comprises upper and lower sealing blocks and at least one sealing block of the upper and lower sealing blocks including a sealing groove having a slanted step portion which is formed at a position corresponding to a lead of the secondary battery, and
    a lead guide for seating the lead on the sealing groove is installed in front of the at least one sealing block, the lead guide being made of an elastic material.

20. A sealing apparatus of a secondary battery which seals a pouch case in which an electrode assembly is installed, wherein:
    the sealing apparatus comprises upper and lower sealing blocks and at least one sealing block of the upper and lower sealing blocks including a sealing groove having a slanted step portion which is formed at a position corresponding to a lead of the secondary battery, and
    a lead guide for seating the lead on the sealing groove is installed in front of the at least one sealing block, the lead guide being made of an insulating material.

* * * * *